(12) United States Patent
Morita

(10) Patent No.: US 7,912,102 B2
(45) Date of Patent: Mar. 22, 2011

(54) INTRACAVITY WAVELENGTH CONVERSION SOLID-STATE LASER GENERATOR

(75) Inventor: Hiroyuki Morita, Sagamihara (JP); Keiko Morita, legal representative, Onojo (JP)

(73) Assignee: Omron Laserfront, Inc., Kanagawa (JP)

( * ) Notice: Subject to any disclaimer, the term of this patent is extended or adjusted under 35 U.S.C. 154(b) by 0 days.

(21) Appl. No.: 12/648,990

(22) Filed: Dec. 29, 2009

(65) Prior Publication Data

US 2011/0044360 A1    Feb. 24, 2011

Related U.S. Application Data

(62) Division of application No. 11/963,217, filed on Dec. 21, 2007, now Pat. No. 7,715,452.

(30) Foreign Application Priority Data

Dec. 27, 2006    (JP) .................................. 2006-353519

(51) Int. Cl.
*H01S 3/10* (2006.01)
(52) U.S. Cl. ........................................... 372/22; 372/93
(58) Field of Classification Search .................. 372/92, 372/95, 22, 20
See application file for complete search history.

(56) References Cited

U.S. PATENT DOCUMENTS

| | | | | | |
|---|---|---|---|---|---|
| 5,936,983 | A | * | 8/1999 | Yusong et al. | 372/22 |
| 6,061,370 | A | * | 5/2000 | Yin | 372/22 |
| 6,229,829 | B1 | * | 5/2001 | Yin | 372/22 |
| 2004/0247001 | A1 | * | 12/2004 | Kusnezow | 372/22 |
| 2006/0114947 | A1 | | 6/2006 | Morita et al. | |

FOREIGN PATENT DOCUMENTS

| | | |
|---|---|---|
| JP | 4722690 | 10/1972 |
| JP | 2126242 A | 5/1990 |
| JP | 3248588 A | 6/1991 |
| JP | 2006-156677 A | 6/2006 |

* cited by examiner

*Primary Examiner* — Minsun Harvey
*Assistant Examiner* — Tuan Nguyen
(74) *Attorney, Agent, or Firm* — Sughrue Mion, PLLC

(57) ABSTRACT

Fundamental laser light having a wavelength of 1,064 nm, for example, is generated by a solid-state laser medium. The fundamental laser light is reflected by a flat mirror and amplified again passing through a Q-switch, a solid-state laser medium, a Q-switch, a Q-switch, a solid-state laser medium, and a Q-switch. The fundamental laser light furthermore reflects from a flat mirror, passes through a flat mirror for second-harmonic resonance, passes through a lens, then reflects from a flat mirror for laser light separation, and enters a nonlinear optical crystal for the third harmonic and a nonlinear optical crystal for the second harmonic. A solid-state laser generator can thereby be obtained in which second-harmonic laser light obtained in an intermediate stage can be used with good efficiency and be converted, for example, to third-harmonic laser light and higher-harmonic laser light with higher efficiency and higher output.

3 Claims, 6 Drawing Sheets

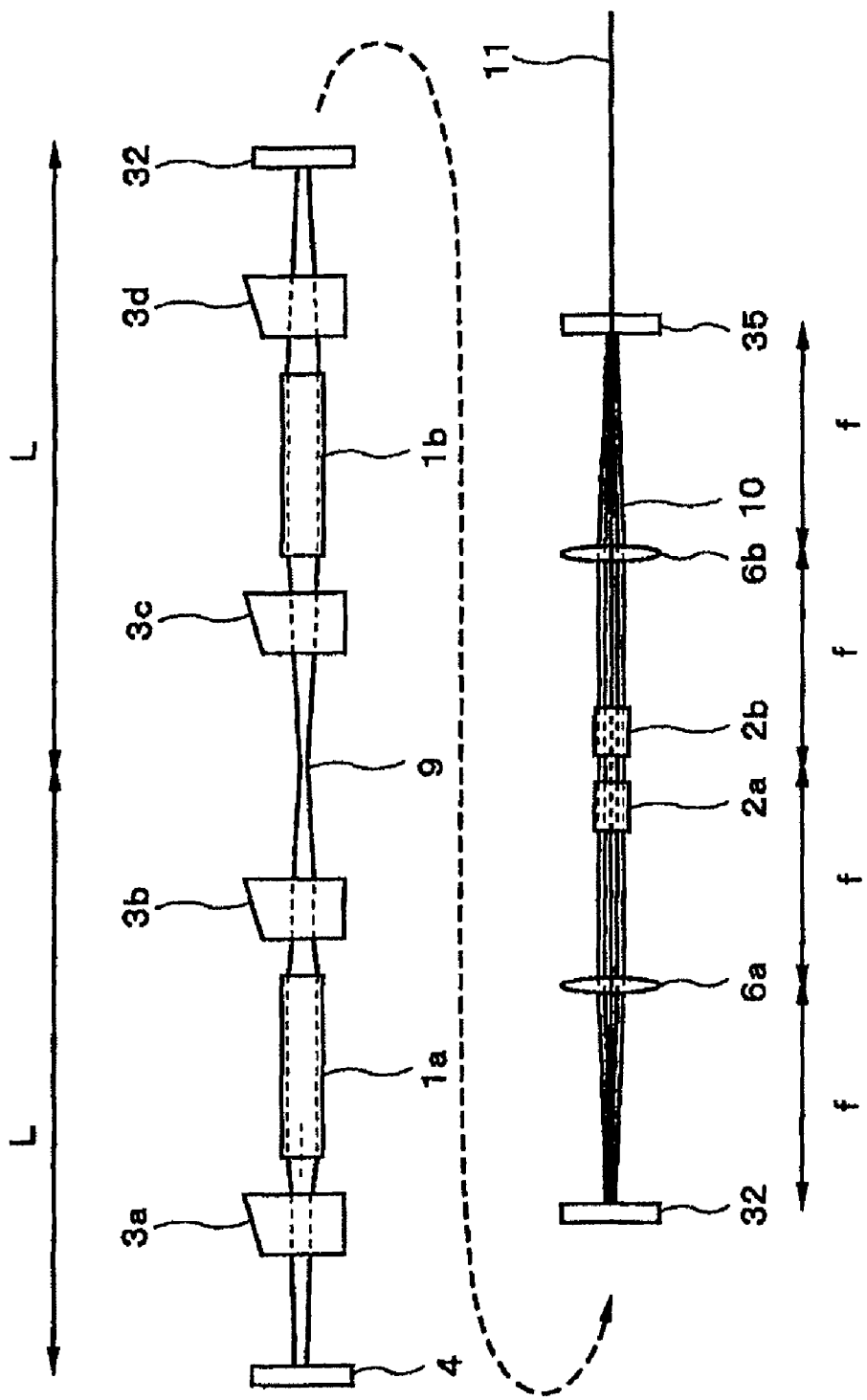

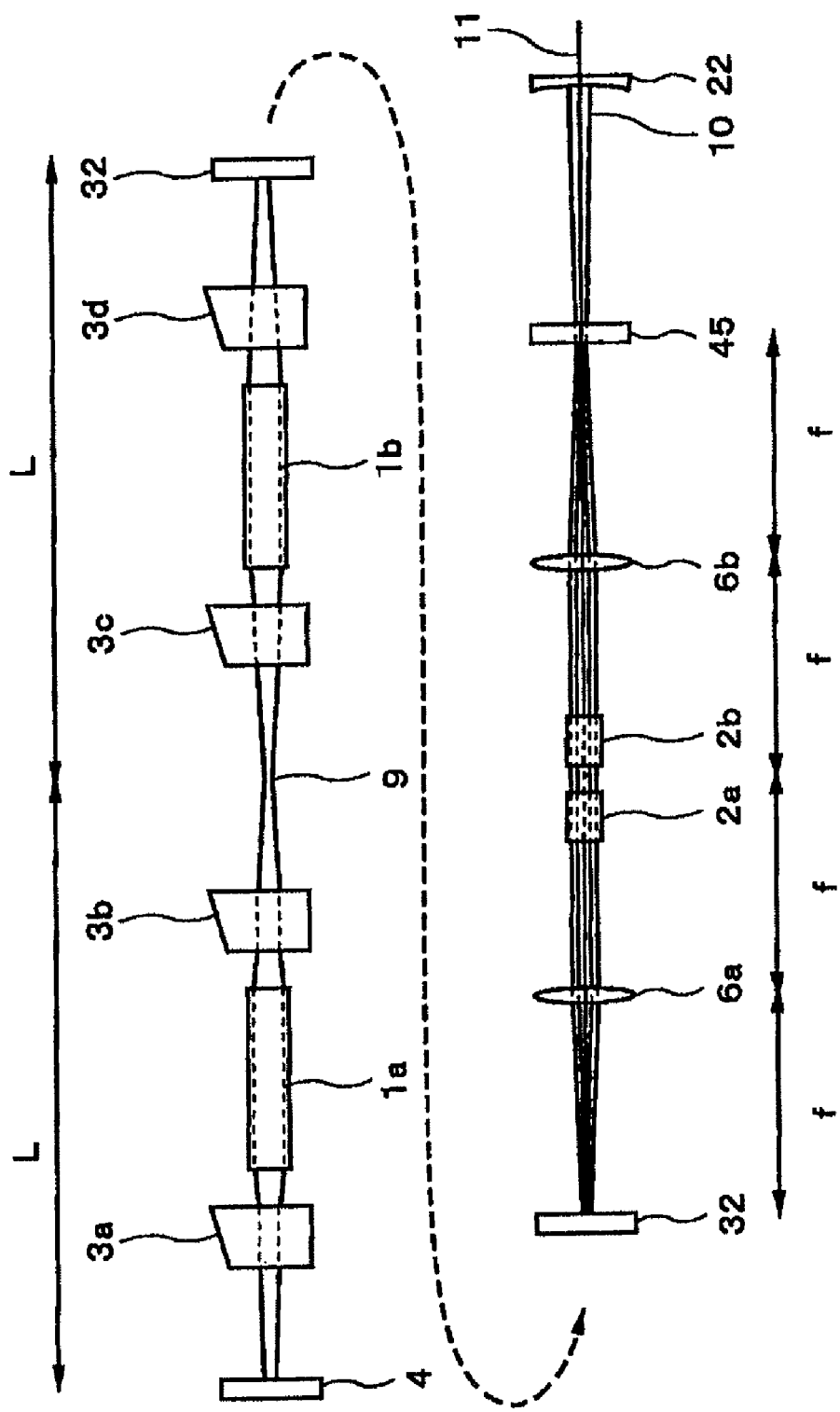

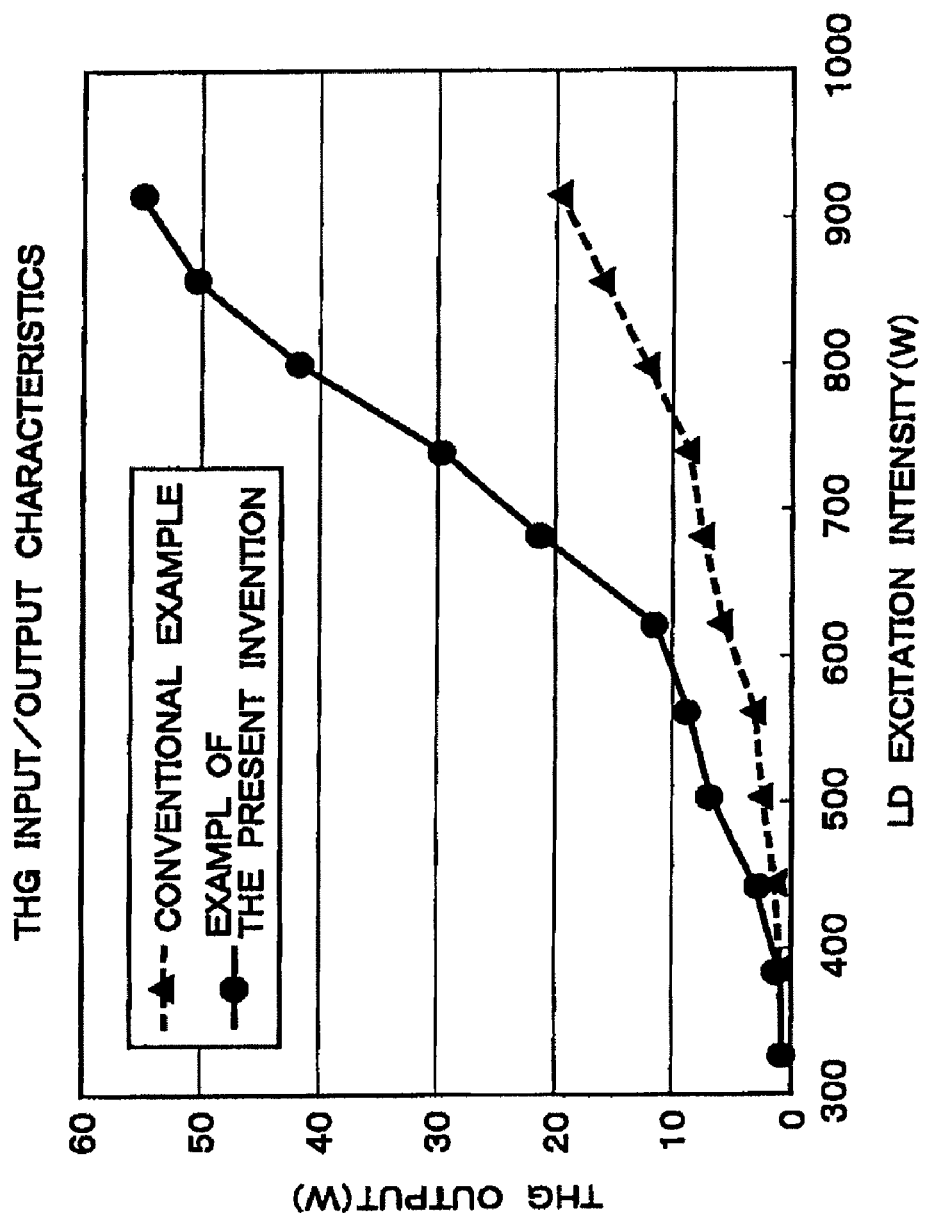

INTRACAVITY WAVELENGTH CONVERSION SOLID-STATE LASER GENERATOR

This application is a divisional application of U.S. application Ser. No. 11/963,217 filed Dec. 21, 2007 which claims priority based on Japanese Patent Application No. 2006-353519 filed Dec. 27, 2006. The entire disclosures of the prior applications are hereby incorporated by reference.

BACKGROUND OF THE INVENTION

1. Field of the Invention

The present invention relates to an intracavity wavelength conversion solid-state laser generator, and particularly relates a solid-state laser generator that converts the wavelength in two or more stages using a plurality of nonlinear optical crystals.

2. Description of the Related Art

Nd:YAG lasers or other solid-state laser generators are widely used as machining lasers. Recently, solid-state laser generators are rapidly increasing in output from several hundred watts to several kilowatts, and the field of application of the lasers is accordingly expanding from the conventional microfabrication field to welding and cutting applications in the automotive industry. Nevertheless, most solid-state laser generators have an emission wavelength range that is limited to the near infrared range of about 1 μm, bringing about a drawback in that the reflectivity of wavelengths outside the near infrared range is high, and the machining efficiency is poor in copper, silicon, and some other materials that have a low absorption rate.

For this reason, methods have been proposed in the prior art in which $LiB_3O_5$ (lithium triborate, LBO), $KTiOPO_4$ (KTP), $\beta$-$BaB_2O_4$ (barium borate, BBO), and other nonlinear optical crystals are used to convert the emission wavelength to a shorter wavelength, i.e., a second harmonic and a third harmonic, further to a fourth and fifth harmonic, and so on, to reduce the reflectivity in the surface of the workpiece, to increase laser light absorption, and to thereby increase the machining efficiency. Extracavity wavelength conversion and intracavity wavelength conversion are types of wavelength conversion in which such nonlinear optical crystals are used.

External cavity wavelength conversion has a low conversion rate from a laser light at a fundamental wavelength (hereinafter referred to as fundamental laser light) to a harmonic laser light, and fundamental laser light must be condensed with high power density in the nonlinear optical crystals in order to obtain a high conversion rate. For this reason, the upper limit of the output obtained from a simple resonator is in the over 100-watt category even with second-harmonic laser light, and it is difficult to achieve a higher output when reliability is considered. With wavelength conversion of a third harmonic, fourth harmonic, and higher harmonics, the output is about 50 W at best because the resulting second harmonic is used.

Intracavity wavelength conversion has a high conversion rate to second-harmonic laser light and better reliability in comparison with external cavity wavelength conversion. This method is disadvantageous, however, in that the thermal lens effect generated in the solid-state laser medium does not allow higher output to be obtained while a stable resonant condition is maintained. The thermal lens effect is a phenomenon in which the solid-state laser medium is heated by being excited, the temperature distribution produced inside the solid-state laser medium creates a refractive index distribution, and the solid-state laser medium behaves like a lens.

Common solid-state laser media absorb almost no fundamental laser light, but often have high absorption characteristics in relation to laser light whose wavelength has been converted, particularly laser light that has been converted to a shorter wavelength. In view of the above, solid-state laser generators having intracavity wavelength conversion are configured to bend the optical path of the laser light at least once and to separate the optical path into wavelength-converted laser light and fundamental laser light by using a dielectric multilayer film mirror to extract only the wavelength-converted laser light from the resonator, and to thereby prevent the wavelength-converted laser light from being absorbed by the solid-state laser medium and to obtain wavelength-converted laser light with good efficiency.

FIG. 1 is a diagram showing the configuration of a resonator in a solid-state laser generator with intracavity wavelength conversion for obtaining the third harmonic (Japanese Laid-open Patent Publication No. 2006-156677). The resonator of a conventional solid-state laser generator has a configuration in which a Q-switch 103a, a solid-state laser medium 101a for amplifying fundamental laser light 109, a Q-switch 103b, a Q-switch 103c, a solid-state laser medium 101b for amplifying the fundamental laser light 109, and a Q-switch 103d are arranged in sequence in a single row between a flat mirror 104 as a resonance mirror, and a flat mirror 108 for redirecting the optical axis of the resonator, as shown in FIG. 1. The Q-switches and solid-state laser media are disposed so that the length of the resonator composed of the Q-switches 103a and 103b and the solid-state laser medium 101a, and the length of the resonator composed of the Q-switches 103c and 103d and the solid-state laser medium 101b are equal to each other.

The flat mirror 107 used for separating laser light is disposed in the path of the fundamental laser light 109 that has been reflected by the flat mirror 108, and a flat mirror 105 as a resonance mirror is disposed in the travel direction of the fundamental laser light 109 reflected by the flat mirror 107. A lens 106a is disposed between the flat mirror 108 and the flat mirror 105. Disposed on the optical axis of the laser between the flat mirror 107 and the flat mirror 105 are a nonlinear optical crystal 102a that converts fundamental laser light 109 to second-harmonic laser light 110, a nonlinear optical crystal 102b that optically mixes the fundamental laser light 109 and the second-harmonic laser light 110 and converts the mixed light to third-harmonic laser light 111, and a lens 106b. The flat mirror 105 has an incidence angle of 0° and is highly reflective with respect to the fundamental wave and the second harmonic. The lenses 106a and 106b are antireflection lenses with respect to the fundamental wave and the second harmonic. The flat mirror 107 has an incidence angle of 45°, is highly reflective with respect to the fundamental wave, and is antireflective with respect to the third harmonic.

Here, the flat mirror 107 may have a dielectric multilayer film that is highly reflective with respect to the fundamental laser light 109 and is antireflective with respect to third-harmonic laser light 111 produced as output, or may be a film that is antireflective or highly reflective with respect to second-harmonic laser light 110 as demanded by the application; and there may also be cases in which reflectivity is not specified.

However, the prior art described above has the following problems. When harmonics of two or more stages are obtained using intracavity wavelength conversion, the harmonic component obtained in an intermediate stage, i.e., the second-harmonic laser light described in Japanese Laid-open Patent Publication No. 2006-156677, is used only once in the process of conversion to higher-order harmonics depending on the purpose. There is therefore a problem in that the conversion efficiency does not become high even were the configuration to have intracavity wavelength conversion.

SUMMARY OF THE INVENTION

An object of present invention is to provide a solid-state laser generator in which second-harmonic laser light obtained in an intermediate stage can be used with good efficiency and be converted, for example, to third-harmonic laser light and higher-harmonic laser light with higher efficiency and higher output.

The solid-state laser generator according to the present invention is a solid-state laser generator for performing wavelength conversion in two or more stages inside a resonator, the generator comprising a first resonator for a fundamental wavelength, composed of first and second flat mirrors; a second resonator for the wavelength-converted laser light, composed of the second flat mirror and a third flat mirror disposed between the first and third flat mirrors, the first and second resonators being superimposed on the same optical axis; a laser medium for amplifying laser light of the fundamental wavelength, disposed between the first and third flat mirrors; and a first nonlinear optical crystal for converting the wavelength of laser light of the fundamental wavelength, at least one nonlinear optical crystal for carrying out higher order wavelength conversion of laser light whose wavelength has been converted by the nonlinear optical crystal, and a lens, disposed between the third and second flat mirrors; the spacing between the lens and the second flat mirror being equal to the focal distance f of the lens.

In the present invention, a resonator configuration is adopted in which a resonator for fundamental laser light and a resonator for a second-harmonic laser light are mutually superimposed on the same optical axis, and the resonators can satisfy a resonance stability condition. Therefore, the output of higher-order harmonic laser light can be readily increased.

Preferably, a dielectric multilayered film is applied to the first flat mirror so as to make the mirror highly reflective with respect to fundamental laser light; a dielectric multilayered film is applied to the second flat mirror so as to make the mirror highly reflective with respect to both fundamental laser light and second-harmonic laser light; a dielectric multilayered film that has an antireflective film for fundamental laser light and a highly reflective film for second-harmonic laser light is applied to the third flat mirror; and a nonlinear optical crystal for conversion to the second harmonic and a plurality of lenses are disposed in confocal positions between the third and second flat mirrors. A resonator for fundamental laser light can thereby be formed between the first flat mirror and the second flat mirror, and a confocal resonator for second-harmonic laser light can be constructed at the same time via a lens disposed at a confocal point between the third mirror and the second flat mirror.

A fourth mirror that has an antireflective film for the entire wavelength-converted harmonic laser light, and also has a highly reflective film for fundamental laser light, and that bends, for example, the optical axis of fundamental laser light by 90°, for example, is disposed between the laser media and the plurality of nonlinear optical crystals, and wavelength-converted harmonic laser light is extracted from inside the resonator formed by the first flat mirror and the second flat mirror. In this case, a flat or curved third mirror that has a highly reflective film for second-harmonic laser light as part of the extracted harmonic laser light, and that also has an antireflective film for higher-order harmonic light, e.g., third-harmonic light, is disposed on the optical axis of the harmonic laser light. A resonator for the second harmonic between the second mirror and the third mirror can thereby be superimposed on the same optical axis as a resonator for fundamental laser light that is formed by the first flat mirror and the second flat mirror. The curvature of the third mirror is made to match the curvature of the light wave plane of the second-harmonic laser light in the position in which the third mirror is disposed, whereby a stable resonator can be obtained.

The fourth mirror has an antireflective film for fundamental laser light, and a highly reflective film for the entire wavelength-converted harmonic laser light, bends the optical axis of the entire wavelength-converted harmonic laser light by 90°, for example, and extracts the wavelength-converted harmonic laser light from inside the resonator formed by the first flat mirror and the second flat mirror. In this case, a curved third mirror that has a highly reflective film for second-harmonic laser light as part of the extracted harmonic laser light, and that also has an antireflective film for higher-order harmonic light, e.g., third-harmonic light, is disposed on the optical axis of the harmonic laser light. A resonator for the second harmonic between the second mirror and the third mirror can thereby be superimposed on the same optical axis as the resonator for fundamental laser light that is formed by the first flat mirror and the second flat mirror. The curvature of the third mirror is made to match the curvature of the light wave plane of the second-harmonic laser light in the position in which the third mirror is disposed, whereby a stable resonator can be obtained.

Higher output can be readily achieved because a plurality of solid-state laser media can be disposed at equidistant intervals between the first and second flat mirrors.

In accordance with the present invention, one of the two flat resonance mirrors for fundamental laser light is used, and another mirror is added to the inside or outside of the resonator for fundamental laser light, whereby a resonator for second-harmonic laser light whose wavelength has been converted in the first stage is formed and a higher harmonic, i.e., the third, fourth, or fifth harmonic, can be efficiency produced inside the double-resonator configuration. The two resonators thus formed both use lenses that are disposed at confocal points inside the resonator, whereby a stable resonator can be obtained. As a result, laser light can be converted with high efficiency, and the output of higher-order harmonic laser light can be increased.

BRIEF DESCRIPTION OF THE DRAWINGS

FIG. 4 is a diagram showing the configuration of the resonator in the solid-state laser generator according to the third embodiment of the present invention;

FIG. 5 is a diagram showing the configuration of the resonator in the solid-state laser generator according to the fourth embodiment of the present invention; and FIG. 6 is a diagram showing the laser output characteristics of the present invention and a conventional third-harmonic solid-state generator that operates on an intracavity wavelength conversion principle.

DESCRIPTION OF THE PREFERRED EMBODIMENTS

Figure 2:
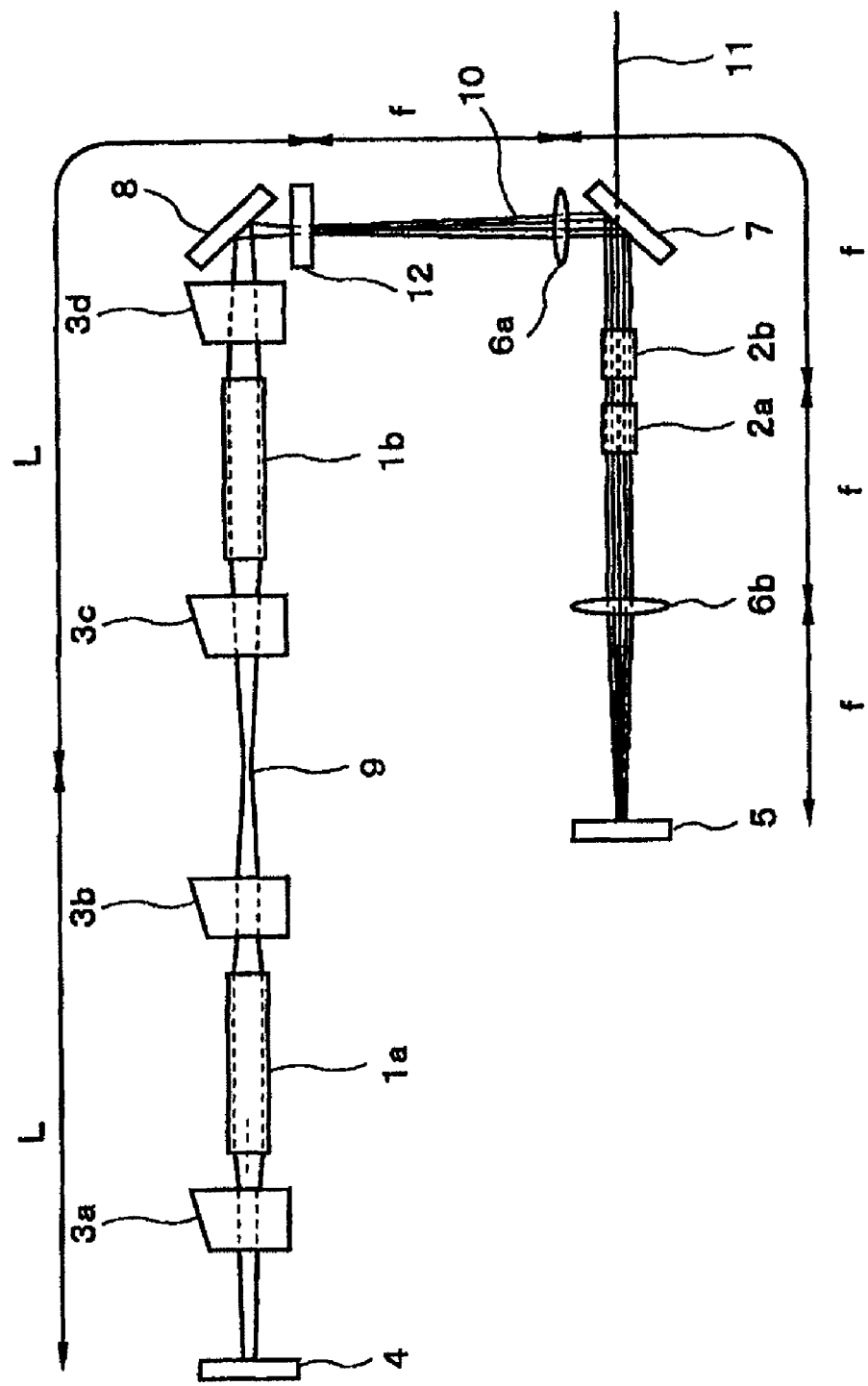
FIG. 2 is a diagram showing the configuration of the resonator in the solid-state laser generator according to the first embodiment of the present invention.

The solid-state laser generator according to embodiments of the present invention is described in detail below with reference to the attached diagrams. The solid-state laser generator according to the first embodiment of the present invention will be described first. FIG. 2 is a diagram showing the configuration of the resonator in the solid-state laser generator of the present embodiment. The solid-state laser generator of the present embodiment is an intracavity wavelength conversion solid-state laser generator and is provided with a resonator that carries out third-harmonic wavelength conversion.

As shown in FIG. 2, the resonator in the solid-state laser generator of the present embodiment has a configuration in which a Q-switch 3a, a solid-state laser medium 1a for amplifying fundamental laser light 9, a Q-switch 3b, a Q-switch 3c, a solid-state laser medium 1b for amplifying the fundamental laser light 9, and a Q-switch 3d are arranged in sequence in a single row between a flat mirror 4 as a resonance mirror, and a flat mirror 8 for redirecting the optical axis of the resonator. The Q-switches and solid-state laser media are disposed so that the length of the resonator composed of the Q-switches 3a and 3b and the solid-state laser medium 1a, and the length of the resonator composed of the Q-switches 3c and 3d and the solid-state laser medium 1b are equal to each other. The flat mirror 4 has an incidence angle of 0° and is highly reflective with respect to the fundamental wave.

The flat mirror 7 used for separating laser light is disposed in the path of the fundamental laser light 9 reflected by the flat mirror 8, and a flat mirror 5 as a resonance mirror is disposed in the travel direction of the fundamental laser light 9 reflected by the flat mirror 7. A lens 6a and a flat mirror 12 for second harmonic resonance are disposed between the flat mirror 8 and the flat mirror 7. Disposed on the optical axis of the laser between the flat mirror 7 and the flat mirror 5 are a nonlinear optical crystal 2a that converts the fundamental laser light 9 to second-harmonic laser light 10, a nonlinear optical crystal 2b that optically mixes the fundamental laser light 9 and the second-harmonic laser light 10 and converts the light to third-harmonic laser light 11, and a lens 6b, as shown in FIG. 2. The flat mirror 5 has an incidence angle of 0° and is highly reflective with respect to the fundamental wave and to the second and third harmonics. The flat mirror 7 has an incidence angle of 45°, is highly reflective with respect to the fundamental wave and the second harmonic, and is antireflective with respect to the third harmonic. The flat mirror 8 has an incidence angle of 45° and is highly reflective with respect to the fundamental wave. The flat mirror 12 has an incidence angle of 0°, is antireflective with respect to the fundamental wave, and is highly reflective with respect to the second harmonic. The lenses 106a and 106b are antireflection lenses with respect to the fundamental wave, second harmonic, and third harmonic.

The solid-state laser media 1a and 1b in the resonator are, e.g., Nd:YAG rods, and a dielectric multilayer antireflection film that transmits perpendicularly incident fundamental laser light 9 is formed on the laser light incidence plane. The nonlinear optical crystal 2a is an LBO ($LiB_3O_5$) crystal on which a dielectric multilayer antireflection film is formed that transmits the entire fundamental laser light 9, second-harmonic laser light 10, and third-harmonic laser light 11 that are perpendicular to the laser light incidence plane, for example. Dielectric multilayer antireflective films that pass perpendicularly incident fundamental laser light 9 are applied to the laser light incidence plane of the Q-switches 3a through 3d.

On the other hand, a dielectric multilayer high-reflection film for reflecting perpendicularly incident fundamental laser light 9 is formed on the laser light incident plane of the flat mirror 4, and a dielectric multilayer high-reflection film that reflects all of the perpendicularly incident fundamental laser light 9, second-harmonic laser light 10, and third-harmonic laser light 11 is formed on the laser light incident plane of the storage unit 5. A dielectric multilayer film that is highly reflective with respect to fundamental laser light 9 and second-harmonic laser light 10, and that is antireflective with respect to third-harmonic laser light 11 is applied to the flat mirror 7.

The lenses 6a and 6b are lenses in which a dielectric multilayer antireflective film that exhibits high transmissivity with respect to all of the perpendicularly incident fundamental laser light 9, second-harmonic laser light 10, and third-harmonic laser light 11 has been applied on the laser light incident plane. The lens 6b is disposed in a position set at a distance away from the flat mirror 5 by a distance f, which is equal to the focal distance of the lens; and the lens 6a is disposed in a position set at a distance 2f, which is twice the focal distance from the lens 6b. Laser media 1a and 1b are disposed at equidistant intervals forward from a position set at a distance f away from the lens 6a. Nonlinear optical crystals 2a and 2b are disposed in a substantially central position between the lenses 6a and 6b. In the solid-state laser generator of the present embodiment, a pair of equivalent lenses is thus disposed facing each other inside the resonator to form a resonator in which laser media with an interposed 1× magnification telescope are disposed at equidistant intervals.

Generally, rod-type solid state laser generators generate heat and produce a thermal lens effect when excited light is inputted into the rod, which is a solid-state laser medium. For this reason, Eq. 1 noted below must be satisfied in order to stably obtain resonance. The term $f_R$ in Eq. 1 below is the thermal lens focal distance of the rod as a solid-state laser medium, $R_1$ and $R_2$ are the radii of curvature of the resonator mirrors, $L_1$ and $L_2$ are the distance between the resonator mirror and the principal plane of the thermal lens.

$$g_1 \cdot g_2 < 1$$

$$g_1 = 1 \cdot (L_2/f_R) \cdot (L_0/R_1)$$

$$g_2 = 1 \cdot (L_1/f_R) \cdot (L_0/R_2)$$

$$L_0 = L_1 + L_2 - L_1 \cdot (L_2/f_R) \qquad \text{[Eq. 1]}$$

In Eq. 1 above, $g_1 \cdot g_2 = 1$ and the stability condition of Eq. 1 above cannot be satisfied when the focal distance $f_R$ of the thermal lens formed inside the resonator is infinite, i.e., when there is no lens inside the resonator composed of a flat mirror in cases in which, for example, the radii of curvature $R_1$ and $R_2$ of the resonator mirrors are infinite; i.e., in cases in which a flat mirror is used as a resonator mirror. On the other hand, most of the nonlinear optical crystals used for wavelength conversion are different than so-called solid-state laser media, and a lens effect is mostly absent. For this reason, laser light converted by nonlinear crystals cannot be stably confined even when a resonator is obtained in the case of a solid-state laser generator that operates on the intracavity wavelength conversion principle.

In view of these circumstances, in the solid-state laser generator of the present embodiment, one or more lens are disposed in suitable positions inside the resonator of the fundamental laser light 9, and mirrors that constitute a resonator for wavelength-converted laser light, e.g., second-harmonic laser light 10, can be added to the interior or exterior of the resonator of the fundamental laser light 9 by using the lenses thus provided, whereby a resonator for the fundamental laser light 9 and a resonator for the wavelength-converted laser light are arranged on the same optical axis, and higher-order wavelength-converted laser light, e.g., third-, fourth-, or fifth-harmonic laser light can be obtained with high efficiency.

Next, the operation of the solid-state laser generator of the present embodiment will be described. In the solid state laser generator of the present embodiment, the fundamental laser light 9 having a wavelength of, e.g., 1,064 nm is generated in the solid-state laser media 1a and 1b. The fundamental laser light 9 is reflected by the flat mirror 4 and is then amplified while passing through the Q-switch 3a, the solid-state laser medium 1a, the Q switch 3b, the Q-switch 3c, the solid-state laser medium 1b, and the Q-switch 3d. The fundamental laser light is furthermore reflected by the flat mirror 8, passed by the flat mirror 12 for second-harmonic resonance and by the lens 6a, reflected by the flat mirror 7 for laser light separation, and made incident on the nonlinear optical crystal 2b for the third harmonic and the nonlinear optical crystal 2a for the second harmonic.

At this time, a portion of the fundamental laser light 9 is converted by the nonlinear optical crystal 2a to second-harmonic laser light 10 having a wavelength of, e.g., 532 nm. The fundamental laser light 9 and second-harmonic laser light 10 that have passed through the nonlinear optical crystal 2a are reflected by the flat mirror 5 via the lens 6b, are again passed in sequence by the lens 6b and the nonlinear optical crystal 2a, and are then passed by the nonlinear optical crystal 2a, whereby a portion of the fundamental laser light 9 is converted to second-harmonic laser light 10 having a wavelength of 532 nm. The fundamental laser light 9 and second-harmonic laser light 10 are thereafter simultaneously directed to the nonlinear optical crystal 2b, and are thereby converted in wavelength by optical mixing to third-harmonic laser light 11 having a wavelength of 355 nm.

The fundamental laser light 9 and second-harmonic laser light 10 are reflected by the flat mirror 7, whereas the third-harmonic laser light 11 is passed through the plurality of power lines 7 and directed to the exterior as the target laser output. The resonator of the fundamental laser light 9 has a configuration in which the fundamental laser light 9, which is part of the second-harmonic laser light 10 and the fundamental laser light 9 reflected by the flat mirror 7, is passed by a flat mirror 12 for second-harmonic resonance and is returned to the flat mirror 4. The second-harmonic laser light 10 is reflected by the flat mirror 12 and returned to the flat mirror 5, and the resonator of the second-harmonic laser light 10 is disposed on the same optical axis.

In the solid-state laser generator according to the first embodiment of the present invention, spacing is provided so that two mutually equivalent lenses 6a and 6b are at confocal points between the flat mirror 12 for second-harmonic resonance and the flat mirror 5 for resonance. Therefore, resonance stability conditions can be satisfied all the way to a high output range even if the length of the resonator for fundamental laser light is extended. At the same time, a stable resonator can be configured from the two confocally disposed lenses 6a and 6b for second-harmonic laser light as well, and the two resonators share the flat mirror 5 for resonance. A single resonator can thereby be placed on the same optical axis.

A symmetrical arrangement is adopted for the solid-state laser media 1a and 1b in a range devoid of a portion extended to form a resonator for second-harmonic laser light. Therefore, higher output can be readily achieved by symmetrically arranging a larger number of solid-state laser media in the same manner.

Figure 3:
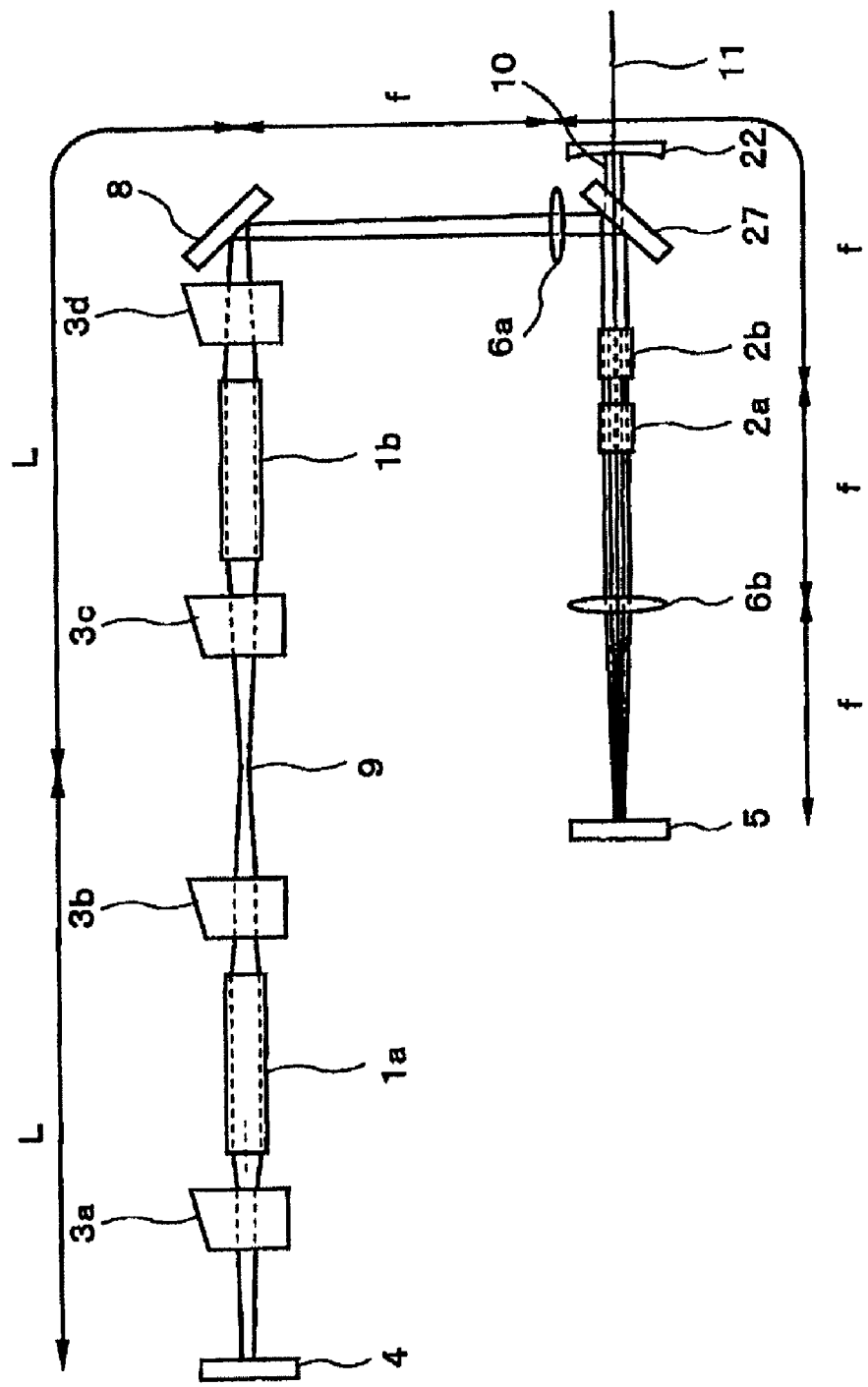
FIG. 3 is a diagram showing the configuration of the resonator in the solid-state laser generator according to the second embodiment of the present invention.

Next, the solid-state laser generator according to the second embodiment of the present invention will be described. The solid-state laser generator of the present embodiment is a solid-state laser generator that operates on an intracavity wavelength conversion principle in the same manner as the solid-state laser generator according to the first embodiment described above, and is provided with a resonator that performs third-harmonic conversion. FIG. 3 is a diagram showing the configuration of the resonator in the solid-state laser generator of the present embodiment. In FIG. 3, the same reference numerals are used for the same constituent elements as in the resonator shown in FIG. 2, and a detailed description is omitted.

As shown in FIG. 3, the resonator in the solid-state laser generator of the present embodiment has a configuration in which the following components are disposed on the optical axis of the laser light between the flat mirror 4 and flat mirror 5 as resonance mirrors: a Q-switch 3a, a solid-state laser medium 1a for amplifying fundamental laser light 9, a Q-switch 3b, a Q-switch 3c, a solid-state laser medium 1b for amplifying the fundamental laser light 9, a Q-switch 3d, a flat mirror 8 for bending the optical axis of the fundamental laser light, a lens 6a, a flat mirror 27 as a mirror for separating laser light, a nonlinear optical crystal 2a that converts fundamental laser light 9 to second-harmonic laser light 10, a nonlinear optical crystal 2b for optically mixing the fundamental laser light 9 and second-harmonic laser light 10 and converting the mixed light to third-harmonic laser light, and a lens 6b.

With the resonator of the second embodiment as well, the length of the resonance section composed of the Q-switches 3a and 3b and the solid-state laser medium 1a, and the length of the resonance section composed of the Q-switches 3c and 3d and the solid-state laser medium 1b are equal to each other. The lens 6b is disposed in a position set away from the flat mirror 5 by a distance f that is equal to the focal distance of the lens, and the lens 6a is disposed in a position set away from the lens 6b by a distance 2f that is twice the focal distance. The flat mirror 8 is disposed in a position set away from the lens 6a by a distance f, and the nonlinear optical crystals 2a and 2b are disposed substantially in the center between the lenses 6a and 6b.

A dielectric multilayer film that is highly reflective with respect to fundamental laser light 9, and that is antireflective with respect to second-harmonic laser light 10 and third-harmonic laser light 11 is applied to the flat mirror 27 for laser light separation, and only the fundamental laser light 9 passes through the laser media 1a and 1b and returns to the flat mirror 4. A concave mirror 22 for causing the second-harmonic laser light 10 to resonate is disposed on the optical axis of the second-harmonic laser light 10 and the third-harmonic laser light 11 that have passed through the flat mirror 27 for laser light separation, and a dielectric multilayer film that is highly reflective with respect to second-harmonic laser light 10 and is antireflective with respect to third-harmonic laser light 11 is applied to the concave mirror 22. In this case, a resonator for second-harmonic laser light 10 is composed of the concave mirror 22, the lens 6b, and the flat mirror 5, and only the target third-harmonic laser light 11 is produced as laser output because the concave curvature of the concave mirror 22 is made to match the light wave plane curvature of the second-harmonic laser light 10. In other words, the concave mirror 22 is a curved mirror that has an incidence angle of 0°, is highly reflective with respect to the second harmonic, and is antireflective with respect to the third harmonic. The flat mirror 27 has an incidence angle of 45°, is highly reflective with respect to the fundamental wave, and is antireflective with respect to the second and third harmonics.

In the solid-state laser generator according to the second embodiment of the present invention, a resonator that is stable also with respect to second-harmonic laser light can be formed because a lens 6b is disposed between the concave mirror 22 for second-harmonic resonance and the flat mirror 5 for resonance, and at the same time the concave curvature of the concave mirror 22 has a curvature that satisfies resonance conditions.

Spacing is provided so that two mutually equivalent lenses 6a and 6b are at confocal points. Therefore, resonance stability conditions can be satisfied all the way to a high output range even if the length of the resonator is extended. The two resonators are made into a single resonator by sharing the flat mirror 5 for resonance. The effects of the solid-state laser generator of the present embodiment are the same as those of the solid-state laser generator according to the first embodiment described above.

Next, the solid-state laser generator according to the third embodiment of the present invention will be described. In the solid-state laser generator of the first and second embodiments, a flat mirror 8 for bending the optical axis of the fundamental laser light 9 is disposed between the Q-switch 3d and the lens 6a, and the flat mirror 7 for laser light separation or the flat mirror 27 is disposed behind the lens 6a. However, the present invention is not limited to a bent optical axis, and a rectilinear arrangement can also be adopted as long as the resonators of the fundamental laser light 9 and the second-harmonic laser light 10 are on the same optical axis without the optical axis being bent using a regularly reflecting resonance mirror. FIG. 4 is a diagram showing the configuration of the resonator in the solid-state laser generator of an embodiment in which the resonators of the fundamental laser light 9 and the second-harmonic laser light 10 are placed in a straight line on the same optical axis. In FIG. 4, the same reference numerals are used for the same constituent elements as in the resonator shown in FIG. 2, and a detailed description is omitted.

As shown in FIG. 4, the resonator in the solid-state laser generator of the present embodiment has a configuration in which the following components are placed in a straight line on the laser optical axis between a flat mirror 4 and a flat mirror 35 as resonance mirrors: a Q-switch 3a, a solid-state laser medium 1a for amplifying fundamental laser light 9, a Q-switch 3b, a Q-switch 3c, a solid-state laser medium 1b for amplifying the fundamental laser light 9, a Q-switch 3d, a flat mirror 32, a lens 6a, a nonlinear optical crystal 2a that converts fundamental laser light 9 to second-harmonic laser light 8, a nonlinear optical crystal 2b for optically mixing the fundamental laser light 9 and second-harmonic laser light 10 and converting the mixed light to third-harmonic laser light, and a lens 6b.

With this resonator as well, the length of the resonance section composed of the Q-switches 3a and 3b and the solid-state laser medium 1a, and the length of the resonance section composed of the Q-switches 3c and 3d and the solid-state laser medium 1b are equal to each other. The lens 6b is disposed in a position set away from the flat mirror 35 by a distance f that is equal to the focal distance of the lens, and the lens 6a is disposed in a position set away from the lens 6b by a distance 2f that is twice the focal distance. The flat mirror 32 is disposed in a position set away from the lens 6a by a distance f, and the nonlinear optical crystals 2a and 2b are disposed substantially in the center between the lenses 6a and 6b.

The flat mirror 32 is disposed so that the fundamental laser light 9, the second-harmonic laser light 10, and the third-harmonic laser light 11 that have passed through the lens 6a are perpendicularly incident on the mirror, and a dielectric multilayer film that transmits the fundamental laser light 9 and the second-harmonic laser light 10, and regularly reflects the third-harmonic laser light 11 is formed on the incident surface of laser light. In this case, the flat mirror 35 concurrently acts as a resonance mirror and as a mirror for laser light separation. A dielectric multilayer film that regularly reflects the perpendicularly incident fundamental laser light 9 and the second-harmonic laser light 10, and transmits the target third-harmonic laser light 11 is formed on the laser light incident surface. In other words, the flat mirror 32 has an incidence angle of 0°, is antireflective with respect to the fundamental wave, and is highly reflective with respect to the second and third harmonics. The flat mirror 35 has an incidence angle of 0°, is highly reflective with respect to the fundamental wave and the second harmonic, and is antireflective with respect to the third harmonic. The flat mirror 45 has an incidence angle of 0°, is highly reflective with respect to the fundamental wave, and is antireflective with respect to the second and third harmonics.

In the solid-state laser generator according to the third embodiment of the present invention, the fundamental laser light that has passed through the flat mirror 32 enters, via the lens 6a, the nonlinear optical crystal 2a that converts the fundamental laser light 9 to second-harmonic laser light 10, and enters the nonlinear optical crystal 2b for optically mixing the fundamental laser light 9 and second-harmonic laser light 10 and converting the mixed light to third-harmonic laser light. The fundamental laser light 9 transmitted by the nonlinear optical crystals 2a and 2b enters the flat mirror 35 via the lens 6b.

In this case, the fundamental laser light 9 and the second-harmonic laser light 10 are regularly reflected by the flat mirror 35 and are again passed through the lens 6b, the nonlinear optical crystals 2a and 2b, and the lens 6a; and the fundamental laser light 9 also passes through the flat mirror 32 and returns to the flat mirror 4. On the other hand, the second-harmonic laser light 10 is reflected by the flat mirror 32, and a resonator is formed between this mirror and the flat mirror 35 via the lenses 6a and 6b. The target third-harmonic laser light 11 is passed through the flat mirror 35 and is directed to the exterior. In this manner, the flat mirror 35 acts as a resonance mirror of the fundamental laser light 9 and the second-harmonic laser light 10, and at the same time acts as a mirror for laser light separation that separates and extracts the target third-harmonic laser light 11.

With the solid-state laser generator according to the third embodiment of the presence information as well, spacing is provided so that the two mutually equivalent lenses 6a and 6b are disposed at confocal points between the flat mirrors 32 and 35. Therefore, resonance stability conditions can be satisfied all the way to a high output range even if the length of the resonator is extended. The effects of the solid-state laser generator of the present embodiment are the same as those of the solid-state laser generator of the above-described first embodiment.

Next, the solid-state laser generator according to the fourth embodiment of the present invention will be described. In the solid-state laser generator of the first to third embodiments described above, a resonance mirror for fundamental laser light and second-harmonic laser light was shared, but the present invention is not limited thereby. Separate resonance mirrors for each type of laser light may be provided. FIG. 5 is a diagram showing the configuration of the resonator in the solid-state laser generator of the present embodiment. In FIG. 5, the same reference numerals are used for the same constituent elements as in the resonators shown in FIGS. 2 and 4, and a detailed description is omitted.

As shown in FIG. 5, the resonator in the solid-state laser generator of the present embodiment has a configuration in which the following components are placed in a straight line on the laser optical axis between a flat mirror 4 and a flat mirror 45 as resonance mirrors: a Q-switch 3a, a solid-state laser medium 1a for amplifying fundamental laser light 9, a Q-switch 3b, a Q-switch 3c, a solid-state laser medium 1b for amplifying the fundamental laser light 9, a Q-switch 3d, a flat mirror 32, a lens 6a, a nonlinear optical crystal 2a that converts the fundamental laser light 9 to second-harmonic laser light 8, a nonlinear optical crystal 2b for optically mixing the fundamental laser light 9 and second-harmonic laser light 10 and converting the mixed light to third-harmonic laser light, and a lens 6b.

With this resonator as well, the length of the resonance section composed of the Q-switches 3a and 3b and the solid-state laser medium 1a, and the length of the resonance section composed of the Q-switches 3c and 3d and the solid-state laser medium 1b are equal to each other. The lens 6b is disposed in a position set away from the flat mirror 45 by a distance f that is equal to the focal distance of the lens, and the lens 6a is disposed in a position set away from the lens 6b by a distance 2f that is twice the focal distance. The flat mirror 12 is disposed in a position set away from the lens 6a by a distance f, and the nonlinear optical crystals 2a and 2b are disposed substantially in the center between the lenses 6a and 6b.

A dielectric multilayer film that is highly reflective with respect to fundamental laser light 9 that has passed through the lens 6b, and that is antireflective with respect to second-harmonic laser light 10 and third-harmonic laser light 11 is formed on the flat mirror 45, and a concave mirror 22 is disposed ahead of the second-harmonic laser light 10 and the third-harmonic laser light 11 that have passed through the flat mirror 45. A dielectric multilayer film that is highly reflective with respect to the second-harmonic laser light 10 and is antireflective with respect to the third-harmonic laser light 11 is formed on the concave mirror 22 in the same manner as the second embodiment, and the curvature of the concave surface is made to match the curvature of the wave plane of the second-harmonic laser light 10.

In the solid-state laser generator according to the fourth embodiment of the present invention, the fundamental laser light that has passed through the flat mirror 32 enters the nonlinear optical crystal 2a that converts fundamental laser light 9 to second-harmonic laser light 10 via the lens 6a, and then enters the nonlinear optical crystal 2b that optically mixes the fundamental laser light 9 and second-harmonic laser light 10 and converts the mixed light to third-harmonic laser light. The fundamental laser light 9 transmitted by the nonlinear optical crystals 2a and 2b enters the flat mirror 45 via the lens 6b.

Here, the fundamental laser light 9 is regularly reflected by the flat mirror 45; is again passed through the lens 6b, the nonlinear optical crystals 2a and 2b, the lens 6a, and the flat mirror 32; and is returned to the flat mirror 4. The second-harmonic laser light 10 and third-harmonic laser light 11 pass through the flat mirror 45, and the second-harmonic laser light 10, which is one of these two light components, is regularly reflected by the concave mirror 22 disposed ahead of the flat mirror, is again passed through the flat mirror 45, and is reflected by the flat mirror 32 via the lenses 6a and 6b. A resonator is formed between the mirrors. The target third-harmonic laser light 11 is passed through the concave mirror 22 and is directed to the exterior as laser output. In this manner, the flat mirror 45 and the concave mirror 22 act as resonator mirrors of the fundamental laser light 9 and the second-harmonic laser light 10, respectively, and at the same time also function as mirrors for separating laser light that separate and remove the target third-harmonic laser light 11.

With the solid-state laser generator according to the fourth embodiment of the present invention, the flat mirror 4 and flat mirror 45 are disposed as resonance mirrors of fundamental laser light. On the other hand, the flat mirror 32 and concave mirror 22 are placed in a straight line on the same optical axis as the resonance mirror of the second-harmonic laser light 10. Although the mirrors are not shared in contrast to prior examples, resonance stability conditions can be satisfied all the way to a high output range even if the length of the resonator is extended. This is because spacing is provided so that the two mutually equivalent lenses 6a and 6b are at confocal points. The effects of the solid-state laser generator of the present embodiment are the same as those of the solid-state laser generator according to the first embodiment described above.

In the solid-state laser generator in the first to fourth embodiments described above, two solid-state laser media 1a and 1b are disposed inside the resonator, but the present invention is not limited thereby. Since the resonator is configured as a symmetric resonator and is extended by a pair of lenses (lenses 6a and 6b) in confocal positions, any number of solid-state laser media can be disposed at equal intervals as long as the damage tolerance of the optical components is not exceeded. Also, Yb:YAG, Nd:YLF, Nd:YVO$_4$, and other solid-state laser media may be used in addition to an Nd:YAG rod.

In the solid-state laser generator of the first to fourth embodiments described above, two nonlinear optical crystals are disposed inside the resonator in order to generate a third harmonic, but the present invention is not limited thereby. Several nonlinear optical crystals may be disposed in order to improve conversion efficiency and to generate a fourth or fifth harmonic. CLBO (CsLi$_6$O$_{10}$), KTP, BBO, or the like may be used in addition to the above-described LBO as the nonlinear optical crystals 2a and 2b.

Figure 1:
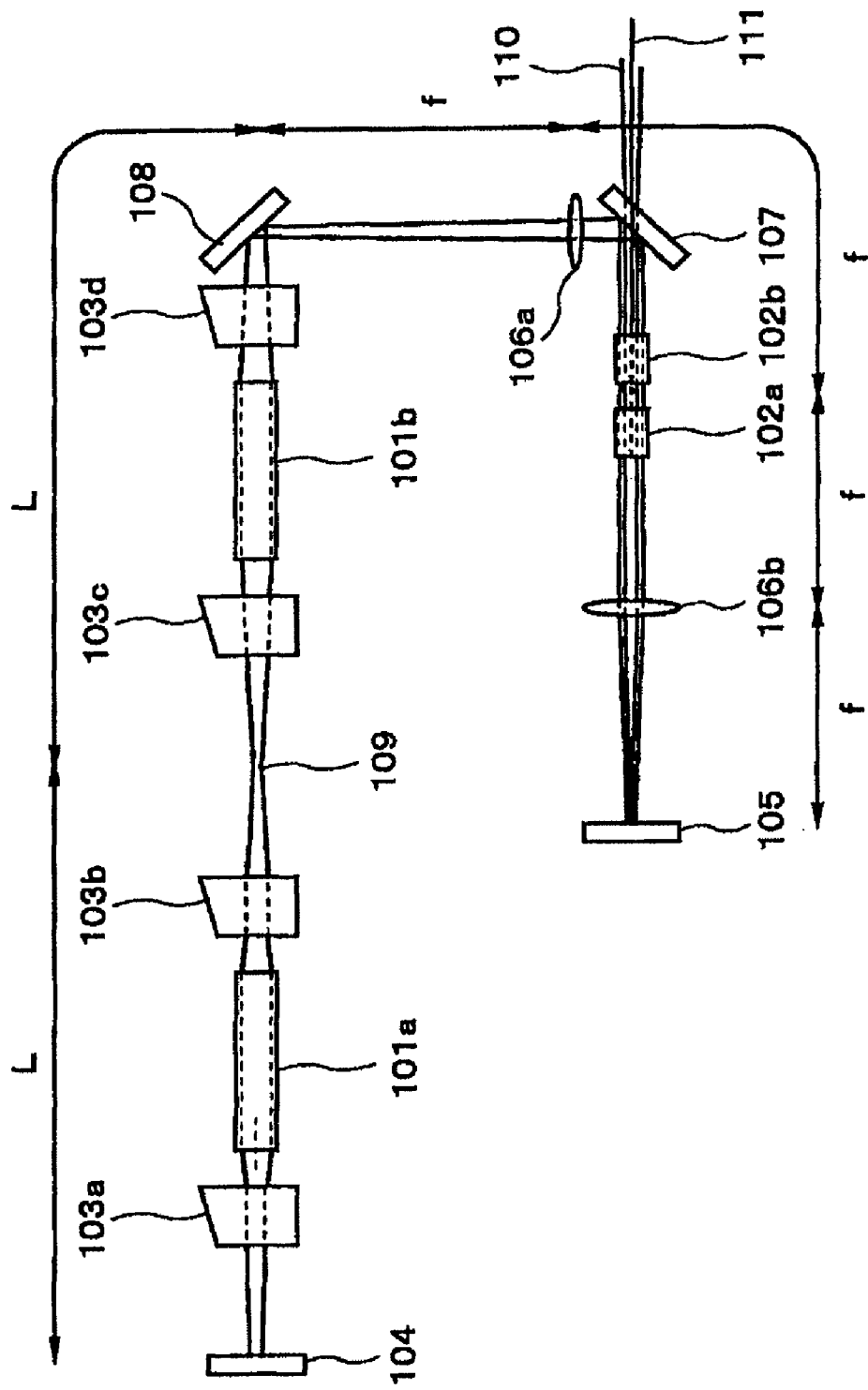
FIG. 1 is a diagram showing the configuration of a resonator in a conventional third-harmonic solid-state generator that operates on an intracavity wavelength conversion principle.

The effects of the examples of the present invention are described below by comparison with a comparative example that is outside the scope of the present invention. The actual output of third-harmonic laser light was measured for a solid-state laser generator (example) that was provided with the resonator shown in FIG. 2 as an example of the present invention, and for a solid-state laser generator (comparative example) provided with the conventionally configured resonator shown in FIG. 1. In this case, the solid-state laser medium was a Nd:YAG rod, and the nonlinear optical crystal was LBO.

FIG. 6 is a graph that compares the characteristics of a conventional solid-state laser generator and the solid-state laser generator according to an example of the present invention, wherein the horizontal axis represents the excitation intensity and the vertical axis represents the output of the third-harmonic laser light. The graph also shows the advantage of the example of the present invention. It is apparent that, in comparison with the solid-state laser generator of the comparative example, the solid-state laser generator of the present example achieves output of third-harmonic laser light that is double or more at the same excitation intensity, as shown in FIG. 6.

What is claimed is:

1. A solid-state laser generator for performing wavelength conversion in two or more stages inside a resonator, the generator comprising:

a first resonator for a fundamental wavelength, composed of first and second flat mirrors;

a third flat mirror disposed between said first and second flat mirrors;

a fourth flat or curved mirror disposed outside of said first resonator;

a second resonator for the wavelength-converted laser light, composed of said second flat mirror or said third flat mirror and said fourth flat or curved mirror, said first resonator and said second resonator being superimposed on the same optical axis;

a laser medium for amplifying laser light of the fundamental wavelength, disposed between said first and third flat mirrors; and a first nonlinear optical crystal for converting the wavelength of laser light of said fundamental wavelength, at least one second nonlinear optical crystal for carrying out higher order wavelength conversion of laser light whose wavelength has been converted by said first nonlinear optical crystal, and a first lens, disposed between said third and second flat mirrors;

the spacing between said first lens and said second flat mirror being equal to the focal distance f of said first lens;

wherein n (n is a natural number) pairs of lenses are disposed between said third flat mirror and said second flat mirror, one or all of said at least two or more nonlinear optical crystals are disposed between two lenses that constitute said pair of lenses, and the spacing between said lens and one or all of said at least two or more nonlinear optical crystals is equal to the focal distance f of said lens.

2. A solid-state laser generator for performing wavelength conversion in two or more stages inside a resonator, the generator comprising:

a first resonator for a fundamental wavelength, composed of first and second flat mirrors;

a third flat mirror disposed between said first and second flat mirrors;

a fourth flat or curved mirror disposed outside of said first resonator;

a second resonator for the wavelength-converted laser light, composed of said second flat mirror or said third flat mirror and said fourth flat or curved mirror, said first resonator and said second resonator being superimposed on the same optical axis;

a laser medium for amplifying laser light of the fundamental wavelength, disposed between said first and third flat mirrors; and a first nonlinear optical crystal for converting the wavelength of laser light of said fundamental wavelength, at least one second nonlinear optical crystal for carrying out higher order wavelength conversion of laser light whose wavelength has been converted by said first nonlinear optical crystal, and a first lens, disposed between said third and second flat mirrors;

the spacing between said first lens and said second flat mirror being equal to the focal distance f of said first lens;

further comprising a fourth flat mirror in which one or a plurality dielectric multilayer film mirrors provided with a dielectric layer film for bending the optical axis is disposed between said first and second flat mirrors, and in which at least one of said dielectric multilayer film mirrors reflects laser light of a fundamental wavelength and transmits laser light whose wavelength has been converted by said second nonlinear optical crystal.

3. A solid-state laser generator for performing wavelength conversion in two or more stages inside a resonator, the generator comprising:

a first resonator for a fundamental wavelength, composed of first and second flat mirrors;

a third flat mirror disposed between said first and second flat mirrors;

a fourth flat or curved mirror disposed outside of said first resonator;

a second resonator for the wavelength-converted laser light, composed of said second flat mirror or said third flat mirror and said fourth flat or curved mirror, said first resonator and said second resonator being superimposed on the same optical axis;

a laser medium for amplifying laser light of the fundamental wavelength, disposed between said first and third flat mirrors; and a first nonlinear optical crystal for converting the wavelength of laser light of said fundamental wavelength, at least one second nonlinear optical crystal for carrying out higher order wavelength conversion of laser light whose wavelength has been converted by said first nonlinear optical crystal, and a first lens, disposed between said third and second flat mirrors;

the spacing between said first lens and said second flat mirror being equal to the focal distance f of said first lens;

further comprising a fourth flat mirror in which one or a plurality dielectric multilayer film mirrors provided with a dielectric layer film for bending the optical axis is disposed between said first and second flat mirrors, and in which at least one of said dielectric multilayer film mirrors transmits laser light of a fundamental wavelength and reflects laser light whose wavelength has been converted by said second nonlinear optical crystal.

* * * * *